US009900932B2

(12) United States Patent
Degen et al.

(10) Patent No.: US 9,900,932 B2

(45) Date of Patent: Feb. 20, 2018

(54) PANEL HEATER WITH TEMPERATURE MONITORING

(75) Inventors: Christoph Degen, Aachen (DE); Dang Cuong Phan, Aachen (DE); Mitja Rateiczak, Wuerselen (DE); Andreas Schlarb, Herzogenrath (DE); Stefan Droste, Herzogenrath (DE); Robert Drese, Aachen (DE); Gunther Vortmeier, Herzogenrath (DE); Patrick Weber, Alsdorf (DE); Olaf Eckelt, Dueren (DE); Walter Schreiber, Aachen (DE); Giordano Soma, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1283 days.

(21) Appl. No.: 13/880,959

(22) PCT Filed: Nov. 18, 2011

(86) PCT No.: PCT/EP2011/070426

§ 371 (c)(1), (2), (4) Date: Jul. 10, 2013

(87) PCT Pub. No.: WO2012/066112

PCT Pub. Date: May 24, 2012

(65) Prior Publication Data

US 2013/0277352 A1 Oct. 24, 2013

(30) Foreign Application Priority Data

Nov. 18, 2010 (EP) .................................... 10191723

(51) Int. Cl.

*B60L 1/02* (2006.01)
*H05B 1/02* (2006.01)

(Continued)

(52) U.S. Cl.

CPC ........... *H05B 1/0236* (2013.01); *H05B 3/265* (2013.01); *H05B 3/84* (2013.01); *H05B 2203/035* (2013.01)

(58) Field of Classification Search

CPC ........ H05B 1/0236; H05B 3/265; H05B 3/84; H05B 2203/035

(Continued)

(56) References Cited

U.S. PATENT DOCUMENTS 3,868,492 A 2/1975 Taylor
3,968,342 A 7/1976 Inaba (Continued)

FOREIGN PATENT DOCUMENTS

DE 10259110 7/2004
DE 102004018109 6/2005

(Continued)

OTHER PUBLICATIONS

Written Opinion for PCT Application No. PCT/EP2011/070426 filed on Nov. 18, 2011. dated May 18, 2013 (English + German Version).

(Continued)

*Primary Examiner* — Phuong Nguyen

(74) *Attorney, Agent, or Firm* — Steinfl + Bruno LLP

(57) ABSTRACT

A panel heater with at least one flat substrate and an electrically conductive coating is described. The electrically conductive coating extends at least over part of a substrate area and is electrically connected to at least two connecting electrodes provided for electrical connection to the two terminals of a voltage source, such that by applying a feed voltage, a heating current flows in a heating field, which is provided with one or a plurality of heating current paths formed into the conductive coating. The panel heater has one or more measurement current paths formed into the electrically conductive coating, which differ at least in sections from the heating current paths. The heating and measurement current paths are formed into the electrically conductive coating by coating-free separating regions. A method for operation and use of the panel heater is also described.

17 Claims, 9 Drawing Sheets

(51) Int. Cl.
*H05B 3/84* (2006.01)
*H05B 3/26* (2006.01)

(58) Field of Classification Search
USPC ....... 219/200, 201, 203, 539, 543, 522, 509, 219/547, 498
See application file for complete search history.

(56) References Cited

U.S. PATENT DOCUMENTS

| | | | |
|---|---|---|---|
| 4,808,799 | A | 2/1989 | Schave |
| 2009/0044464 | A1* | 2/2009 | Schmidt ............ B32B 17/10036 52/171.2 |
| 2010/0163675 | A1* | 7/2010 | Rashid .............. B32B 17/10009 244/129.3 |
| 2011/0108537 | A1 | 5/2011 | Schall |

FOREIGN PATENT DOCUMENTS

| | | |
|---|---|---|
| DE | 102008018147 | 10/2009 |
| DE | 102008029986 | 7/2010 |
| EP | 0349916 | 1/1990 |

OTHER PUBLICATIONS

PCT International Search Report dated Mar. 16, 2012 for PCT Application PCT/EP2011/070426 filed on Nov. 18, 2011 in the name of Saint-Gobain Glass France (English + German).

* cited by examiner

PANEL HEATER WITH TEMPERATURE MONITORING

CROSS REFERENCE TO RELATED APPLICATIONS

The present application is the US national stage of International Patent Application PCT/EP2011/070426 filed on Nov. 18, 2011 which, in turn, claims priority to European Patent Application EP 10191723.5 filed on Nov. 18, 2010.

The invention is in the technical area of panel heaters and relates to a panel heater with temperature monitoring.

PRIOR ART

Panel heaters with an electrical heating layer are used in many ways. They are well known per se and have already been described many times in the patent literature. Merely by way of example, reference is made in this regard to the patent applications DE 102008018147 A1, DE 102008029986 A1, DE 10259110 B3, and DE 102004018109 B3. Thus, for example, transparent panel heaters are used in motor vehicles as windshields since the visual field of windshields must, by law, have no vision restrictions. By means of the heat generated by the heating layer, condensed moisture, ice, and snow can be removed in a short time. In living spaces, they can serve instead of conventional heaters for living space heating, for which purpose they are, for example, installed on walls or free-standing. Panel heaters can likewise be used as heatable mirrors or transparent decorative elements.

But, in practice, with panel heaters, the problem can arise that by means of objects situated on the heating layer, the heat produced is no longer adequately dissipated into the surroundings. As a result, a local overheating ("hot spot") can occur. This can happen, for example, with panel heaters used for space heating by means of articles of clothing inadvertently laid thereon. The local overheating can negatively affect and even damage the heating layer.

Object of the Invention

In contrast, the object of the present invention consists in advantageously improving conventional panel heaters such that for transparent panel heaters, in particular, temperature monitoring is simply and reliably enabled. This and other objects are accomplished according to the proposal of the invention by a panel heater and an arrangement with such a panel heater with the characteristics of the coordinated claims. Advantageous embodiments of the invention are indicated by the characteristics of the subclaims.

According to the invention, a panel heater with at least one flat substrate and an electrically conductive, heatable, preferably transparent coating is presented. The heatable coating is implemented such that its electrical resistance changes with a variation of the temperature. The heatable coating extends at least over part of a substrate area of the flat substrate. The panel heater is further provided with at least two connecting electrodes provided for electrical connection to the two terminals of a voltage source, which are electrically connected to the conductive coating such that by applying a feed voltage, a heating current flows in a heating field formed by the conductive coating. The heating field has, for this purpose, one or a plurality of heating current paths to conduct the heating current introduced via the two connecting electrodes, which paths are formed into the conductive coating formed by means of (electrically isolated) separating regions free of the conductive coating, i.e., coating free, for example, linear separating regions (separating lines). The heating current paths are thus formed by the conductive coating. In the case of a transparent coating, the heating current paths are, accordingly, transparent.

The panel heater according to the invention can be implemented in many ways and can serve, for example, as a flat heater for living space heating, as a heatable mirror, a heatable decorative element, or a heatable pane, in particular, a windshield or rear window pane of a motor vehicle, with this listing being merely illustrative and not intended to restrict the invention in any way.

According to the proposal of the invention, the panel heater includes one or a plurality of measurement current paths formed into the conductive coating as conductor tracks, which are different, at least in sections, from the heating current paths. The measurement current paths are formed into the conductive coating by means of (electrically isolated) separating regions free of conductive coating, i.e., coating free, for example, linear separating regions (separating lines). The measurement current paths are thus formed by the conductive coating. In the case of a transparent coating, the measurement current paths are transparent. Each measurement current path is thermally coupled at least to a portion of the heating field and has at least two connecting sections for connecting a measuring device for ascertaining its electrical resistance. In contrast to the heating current paths, which serve for conducting the heating currents introduced via the connecting electrodes, the measurement current paths are provided for conducting a measurement current introduced via the connecting electrodes for measuring the electrical resistance. The measurement current paths can have a greater electrical resistance per length than the heating current paths, which results, for example, from a smaller width of the measurement current paths transverse to the length.

The panel heater according to the invention thus advantageously enables ascertaining the temperature of the respective measurement current path thermally coupled to at least one portion of the heating field, by ascertaining the electrical resistance of the measurement current path. In this manner, local hot spots in the region of the heating field can be reliably and safely detected.

In the panel heater according to the invention, the measurement current paths can be produced in a simple manner by structuring the conductive coating, with the measurement current paths being transparent in the case of a transparent conductive coating, such that the temperature of the heating field can be monitored particularly advantageously even in transparent panel heaters.

In an advantageous embodiment of the panel heater according to the invention, the measurement current paths are formed at least in sections, in particular completely, in an edge strip surrounding the heating field and electrically separated from the heating field. This measure enables a particularly simple contacting of the connecting sections of the measurement current paths in the edge strip. In addition, the measurement current paths can have a course extending along the substrate edge for the detection of hot spots near the edge. Here, the measurement current paths can be implemented, in particular at least in sections, in portions of the edge strip different from each other, by means of which a spatially resolved detection of hot spots in the heating field is possible.

In another advantageous embodiment of the panel heater according to the invention, one or a plurality of measurement current paths are implemented in each case such that they change their path direction multiple times in a spatially limited zone of the edge strip, hereinafter referred to as "measuring zone". The measurement current paths can have, in the measuring zones, for example, a meanderingly curved course, with it equally possible to provide any other course with an alternating or opposing change of path direction. In other words, each measurement current path includes a plurality of current path sections curved in opposing directions. A relatively large proportion of the conductor track of a measurement current path is, in each case, included in the measuring zones, which is accompanied by a correspondingly large voltage drop of a measurement voltage applied to the connecting sections. The measuring zones thus enable a detection of hot spots with high sensitivity and particularly good spatial resolution. It can also be advantageous for the measuring zones to be disposed spatially distributed at least over a portion of the edge strip, in particular uniformly spatially distributed, enabling a particularly good spatial resolution in the detection of hot spots of the heating field.

In another advantageous embodiment of the panel heater according to the invention, the measurement current paths are electrically separated from the heating field. This can be achieved, for example, in that the measurement current paths are contained completely within the edge strip electrically isolated from the heating field. By means of this measure, the heating and measuring current are electrically separated such that the ascertaining of the electrical resistance of the measurement current path is designed particularly simply.

In another advantageous embodiment of the panel heater according to the invention, one or a plurality of measurement current paths has, in each case, a measurement current path section that is part of a heating current path or is formed by a complete heating current path. In this case, a connecting electrode connected to the heating current path can serve, in particular, as a connecting section of a measurement current path. The electrical resistance of the path section of a measurement current path not formed by the heating current path can, in particular, be greater than that in the remaining measurement current path, which can be realized in a simple manner by means of a correspondingly smaller width of the conductor track. By means of this measure, a simplified production of the measurement current paths can be advantageously obtained. Additionally, with measurement current paths running partially in the edge strip, the space requirement in the edge strip is reduced such that more measurement current paths can be formed into the conductive coating with a given dimensioning of the edge strip. Also, the implementation of measuring zones in the edge strip is facilitated.

In another advantageous embodiment of the panel heater according to the invention, the connecting electrodes are electrically connected to two measurement current path arrays connected in parallel, in which, in each case, two measurement current paths are connected in series, with each measurement current path array having a connecting section disposed between the two serially connected measurement current paths for connecting the measuring device for ascertaining the electrical resistance. By means of this measure, the measurement current paths can be connected to a Wheatstone bridge known per se to the person skilled in the art, which enables a particularly precise detection of resistance changes of the measurement current path.

In another advantageous embodiment of the panel heater according to the invention, at least one measurement current path serves as a reference current path for detecting a reference resistance for other measurement current paths. This enables a particularly reliable detection of hot spots in the heating field since temperature-induced resistance changes of measurement current paths are detectable due to changes in the ambient temperature or in heat dissipation of the heating field in accordance with specifications.

The invention further extends to an arrangement with a panel heater as described above, which has at least one measuring device connected to the connecting sections of the measurement current paths for ascertaining electrical resistances as well as a control and monitoring device connected to the measuring device by a data link. The control and monitoring device is set up programmatically such that the feed voltage applied to the connecting electrodes is turned off or at least reduced when the electrical resistance of a measurement current path exceeds a definable (selectable) threshold value. By means of this measure, a local overheating of the heating field can be advantageously remedied automatically. The control and monitoring device is electrically connected, for this purpose, to a device coupled to the voltage source for providing the feed voltage, by means of which device the feed voltage can be reduced or turned off.

In an advantageous embodiment of the arrangement according to the invention, the control and monitoring device is connected by a data link to an optical and/or acoustic output device for outputting optical and/or acoustic signals, with the control and monitoring device designed such that an optical and/or acoustic signal is outputted when the electrical resistance of a measurement current path exceeds the threshold value mentioned or another predefinable threshold value. By means of this measure, a user can be advantageously alerted if there is overheating so appropriate measures can be taken. In particular, a user can already be alerted before the feed voltage is turned off.

The invention further extends to a method for operating a panel heater with at least one flat substrate and an electrically conductive coating, which extends at least over part of the substrate area and is electrically connected to at least two connecting electrodes provided for electrical connection to the two terminals of a voltage source such that by applying a feed voltage, a heating current flows in a heating field. The panel heater can, in particular, be a panel heater as described above. In the method according to the invention, the electrical resistance of one or a plurality of measurement current paths thermally coupled to the heating field is ascertained, with the measurement current paths formed into the conductive coating, in each case, by coating-free separating regions, for example, separating lines, and formed by the conductive coating.

In an advantageous embodiment of the method according to the invention, the feed voltage is reduced or turned off when the electrical resistance of a measurement current path exceeds a predefinable threshold value.

In another advantageous embodiment of the method according to the invention, an optical and/or acoustic signal is outputted when the electrical resistance of a measurement current path exceeds the threshold value mentioned or another predefinable threshold value.

The invention further extends to the use of a panel heater as described above as a functional and/or decorative individual piece and as a built-in part in furniture, devices, and buildings, in particular as a heater in living spaces, for example, as a wall mountable or freestanding heater, as well as in means of transportation for travel on land, in the air, or on water, in particular in motor vehicles, for example, as a windshield, rear window, side window, and/or glass roof.

It is understood that the aforementioned characteristics and those to be explained in the following can be used not only in the combinations indicated, but also in other combinations or alone, without departing from the scope of the present invention.

BRIEF DESCRIPTION OF THE DRAWINGS

The invention is now explained in detail using exemplary embodiments with reference to the accompanying figures. They depict, in simplified, not-to-scale representation.

DETAILED DESCRIPTION OF THE DRAWINGS

Position and direction indications, such as “upper”, “lower”, “left”, and “right”, made in the following refer to the panel heaters depicted in the figures and are used exclusively for the purpose of a simpler description of the invention. It is understood that the panel heaters can, in each case, be differently oriented such that these indications must not be interpreted as restrictive.

Figure 1:
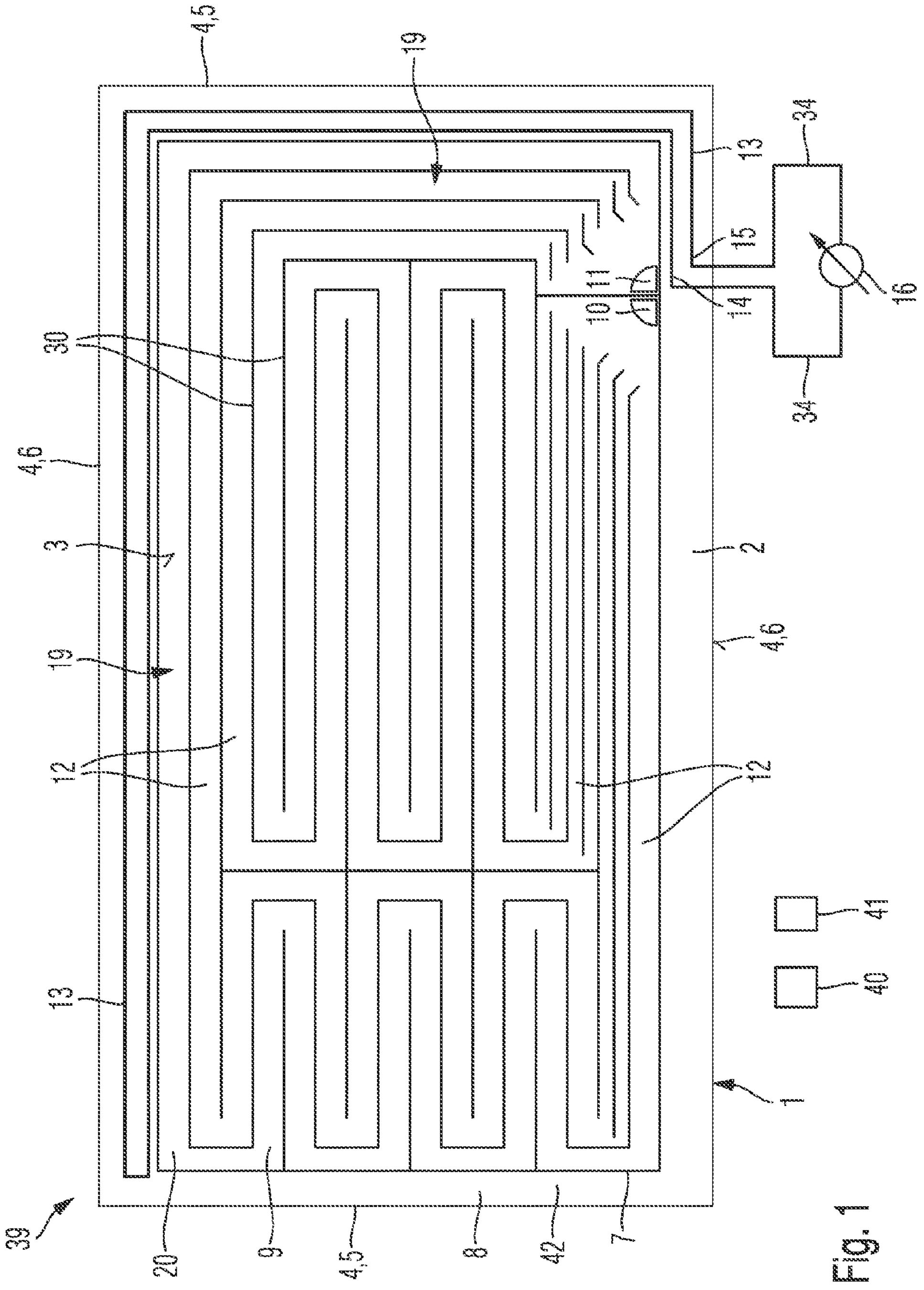
FIG. 1 a schematic top view of a first exemplary embodiment of the panel heater according to the invention with a measurement current path running in the edge strip.

Reference is first made to FIG. 1, in which, as a first exemplary embodiment of the invention, a panel heater referred to as a whole by the reference character 1 or an arrangement 39 including the panel heater 1 is illustrated. The panel heater 1 is used for flat heat generation and can be used, for example, instead of a conventional heater for heating a living space. For this purpose, it can be affixed on a wall or integrated therein, but with a freestanding installation also possible. It is also conceivable to implement the panel heater 1 as a mirror or a decorative item. Another exemplary application of the panel heater 1 is its use as a motor vehicle window pane, in particular a windshield of a motor vehicle.

The panel heater 1 comprises at least one flat substrate 2 made of an electrically insulating material, wherein the panel heater 1 has, as single pane glass, a single substrate 2 and, as a composite pane, two substrates 2 fixedly bonded to each other by a thermoplastic adhesive layer. The substrate 2 can be made of a glass material, for example, float glass, cast glass, or ceramic glass or a non-glass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with sufficient chemical resistance, suitable shape and size stability, as well as, if desired, adequate optical transparency can be used. Plastic, in particular based on polyvinyl butyral (PVB), ethylene vinyl acetate (EVA), and polyurethane (PU), can, for example, be used as an adhesive layer for bonding the two substrates 2 in a composite pane.

In the exemplary embodiment depicted in FIG. 1, the panel heater comprises a rectangular substrate 2 with a surrounding substrate edge 4, which is composed of two short edges 5 and two long edges 6. It is understood that the invention is not restricted to this, but rather that the substrate 2 can also have any other shape suitable for the practical application, for example, a square, round, or oval shape. Depending on the application of the panel heater 1, the substrate 2 can be rigid or flexible. This also applies to its thickness, which can vary widely and is, for a glass substrate 2, for example, in the range from 1 to 24 mm.

For flat heat generation, the panel heater 1 comprises an electrically conductive, heatable coating 3, which is applied here, for example, to a (main) surface area or substrate area 42 of the substrate 2. The coating 3 occupies, for example, more than 50%, preferably more than 70%, particularly preferably more than 80%, and even more preferably more than 90% of the substrate area 42 of the substrate 2. The coating 3 can, in particular, be applied over the entire surface on the substrate area 42. The area covered by the coating 3 can, depending on the application, range, for example, from 100 $cm^2$ to 25 $m^2$. It would also be possible not to apply the coating 3 on the substrate 2 but, instead, to apply it on a large-area carrier, which is subsequently adhered to the substrate 2. Such a carrier can, in particular, be a plastic film, made, for example, of polyamide (PA), polyurethane (PU), polyvinyl chloride (PVC), polycarbonate (PC), polyester (PE), or polyvinyl butyral (PVB). Alternatively, such a carrier can also be bonded to adhesive films (e.g., PVB films) and be adhesively bonded as a three-layer structure to the two substrates 2 of a composite pane.

The coating 3 includes or is made of an electrically conductive material. Examples of this are metals with high electrical conductivity such as silver, copper, gold, aluminum, or molybdenum, metal alloys such as silver alloyed with palladium, as well as transparent, conductive oxides (TCOs). TCOs are preferably indium tin oxide, fluoride-doped tin oxide, aluminum-doped tin dioxide, gallium-doped tin dioxide, boron-doped tin dioxide, tin zinc oxide, or antimony-doped tin oxide. The coating 3 can consist of one conductive individual layer or a layer structure that includes at least one conductive sublayer. For example, such a layer structure comprises at least one conductive sublayer, preferably silver (Ag), and other sublayers such as anti-reflection and blocker layers. The thickness of the coating 3 can vary widely depending on the application, with the thickness at every point being, for example, in the range from 30 nm to 100 μm. In the case of TCOs, the thickness is, for example, in the range from 100 nm to 1.5 μm, preferably in the range from 150 nm to 1 μm, and even more preferably in the range from 200 nm to 500 nm. Advantageously, the coating 3 has high thermal stability such that it withstands the temperatures of typically more than 600° C. necessary for the bending (prestressing) of a glass pane used as substrate 2 without functional degradation. However, a coating 3 with low thermal stability, which is applied after the prestressing of the glass pane, can also be provided. The coating 3 can also be applied on a substrate 2 that is not prestressed. The sheet resistance of the coating 3 is preferably less than 20 ohm per unit of area and is, for example, in the range from 0.25 to 20 ohm per unit of area. In the exemplary embodiment depicted, the sheet resistance of the conductive coating 3 is a few ohms per unit of area and amounts, for example, to 1 to 2 ohm per unit of area.

The coating 3 is, for example, deposited from the gas phase, for which purpose methods known per se, such as chemical vapor deposition (CVD) or physical vapor deposition (PVD), can be used. Preferably, the coating 3 is applied on the substrate 2 by sputtering (magnetron cathode sputtering).

In the case of the panel heater 1 illustrated in FIG. 1, it can be advantageous for its practical application, for example, as a free-standing heater or windshield of a motor vehicle for it to be transparent to visible light in the wavelength range from 350 nm to 800 nm, with the term "transparency" understood to mean light transmittance of more than 50%, preferably more than 70%, and, in particular more than 80%. This can be obtained, for example, by means of a transparent substrate 2 made of glass and a transparent coating 3 based on silver (Ag).

In the panel heater 1, the conductive coating 3 is provided along the substrate edge 4 with a circumferential, electrically isolated, first separating line 7, at a distance, here, for example, of a few cm, in particular 1 to 2 cm, from the substrate edge 4. By means of the first separating line 7, an outer edge strip 8 of the conductive coating 3 is electrically partitioned off from an inner remainder of the conductive coating 3, which serves as heating field 9. The edge strip 8 effects electrical insulation of the heating field 9 against the outside and protects it against corrosion penetrating from the substrate edge 4. In addition, the coating 3 can be removed circumferentially to improve the edge insulation in, for example, a few-millimeter-wide part of the edge strip 8, which is not shown in detail in FIG. 1.

In the panel heater 1, only the heating field 9 serves for flat heat generation. For this, two connecting electrodes 10, 11 electrically-galvanically connected to the heating field 9 are provided, which are disposed here, for example, on the lower long edge 6 near the right short edge 5. The connecting electrodes 10, 11 serve for applying a feed voltage introduced supplied from the outside to the heating field 9, with area-wise heat given off by the heating field 9 due to the heating current introduced. For this, the two connecting electrodes 10, 11 can be connected to the two terminals of a voltage source (not shown). The connecting electrodes 10, 11 implemented here, for example, in each case, in the shape of quarter discs are produced, for example, from a metallic printing paste in a printing process, in particular a screen printing process. Alternatively, it would also be possible to produce the two connecting electrodes 10, 11, for example, from a metal foil and to subsequently connect them electrically to the heating field 9, in particular by soldering. Here, it is not significant whether the coating 3 is first deposited on the substrate 2 and the connecting electrodes 10, 11 subsequently produced or if the connecting electrodes 11, 12 are produced first and the coating 3 subsequently deposited. The specific electrical resistance for connecting electrodes 10, 11 produced, in particular, in the printing method is, for example, in the range from 2 to 4 μOhm·cm.

As depicted in FIG. 1, the heating field 9 is divided by a number of electrically isolated second separating lines 30 into a plurality of heating current paths 12 electrically connected in parallel. The heating current paths 12 begin, in each case, on one, first, connecting electrode 10 and end on the other, second, connecting electrode 11, with the part of the heating field 9 directly adjacent the two connecting electrodes 10, 11 free of second separating lines 30. Thus, in the heating field 9, a defined course of the heating current introduced by the two connecting electrodes 10, 11 can be obtained along the heating current paths 12 defined by the second separating lines 30. The electrical resistance for a desired heat output can be precisely adjusted by means of the width or cross-sectional area and the length of the heating current paths 12. The division of the heating field 9 by separating lines to create parallel heating current paths 12 is known per se, for example, from the patents cited in the introduction, such that it is unnecessary to discuss them in detail here. The separating lines 7, 30, in which the conductive coating 3 is, in each case, completely removed, can be incorporated into the conductive coating 3, for example, by laser writing using a laser cutting robot. It is noted that the layout of the second separating lines 30 depicted in FIG. 1 is merely illustrative and that heating current paths 12 with a different course can also be provided in the panel heater 1.

As also depicted in FIG. 1, a measurement current path 13 in the form of a conductor track electrically isolated from the heating field 9 is formed into the conductive coating 3 within the edge strip 8. The measurement current path 13 is formed by the conductive material of the coating 3, with, for this purpose, a separating line circumscribing the measurement current path 13 introduced into the edge strip 8, for example, by lasering, which, in the interest of clarity, is not depicted in detail in FIG. 1. By means of this separating line, in which the conductive coating 3 is completely removed, the measurement current path 13 is electrically partitioned off from the rest of the edge strip 8. Starting from a first connecting section 14 at the level of the two connecting electrodes 10, 11, the measurement current path 13 runs a stretch along the lower long edge 6, the right short edge 5 adjacent thereto, and the upper long edge 6 adjacent thereto roughly to the level of a left heating field corner 20 and in the opposite direction back to a second connecting section 15 at the level of the two connecting electrodes 10, 11, by which means a conductor loop is formed. The two connecting sections 14, 15 of the measurement current path 13 are electrically connected to connection lines 34 of an electrical measuring device 16. For this, they can be provided with electrically galvanically coupled electrodes, which is not shown in detail in FIG. 1. By means of the two connection lines 14, 15, the measurement current path 13 is short-circuited with the measuring device 16 connected therebetween to form a measuring circuit for measuring an electrical voltage or an electrical current to ascertain the electrical resistance of the measurement current path 13. The arrangement of the two connecting sections 14, 15 on the substrate edge 4 enables particularly simple contacting. It is understood that the precise course of the measurement current path 13 within the edge strip 8 can be electively designed such that the invention is not restricted to the course depicted in FIG. 1.

Here, the measurement current path 13 has, for example, a homogeneous cross-sectional area which results from a uniform thickness (corresponding to a coating 3 applied with a constant thickness on the substrate 2) and width of the conductor track transverse to its length. Accordingly, the measurement current path 13 has a substantially uniform electrical resistance such that a measurement voltage applied to the two connecting sections 14, 15 drops at least approximately uniformly over the measurement current path 13. In the present exemplary embodiment, the thickness of the conductor track measured perpendicular to the substrate 2 or substrate area 42 and transverse to the length of the current path 13 is, for example, in the range from 50 to 100 nanometer (nm). The width of the conductor track measured parallel to the substrate 2 or substrate area 42 and transverse of the length of the measurement current path 13 is, for example, in a range from more than 100 micron (μm) and less than 5 millimeter (mm). Due to the relatively low width of the measurement current path 13, its electrical resistance is substantially greater than the electrical resistance of any one of the heating current paths 12 in the heating field 9. The width of the heating current paths 12 is, for example, more than 10 mm and is, in particular, 30 mm.

Figure 8:
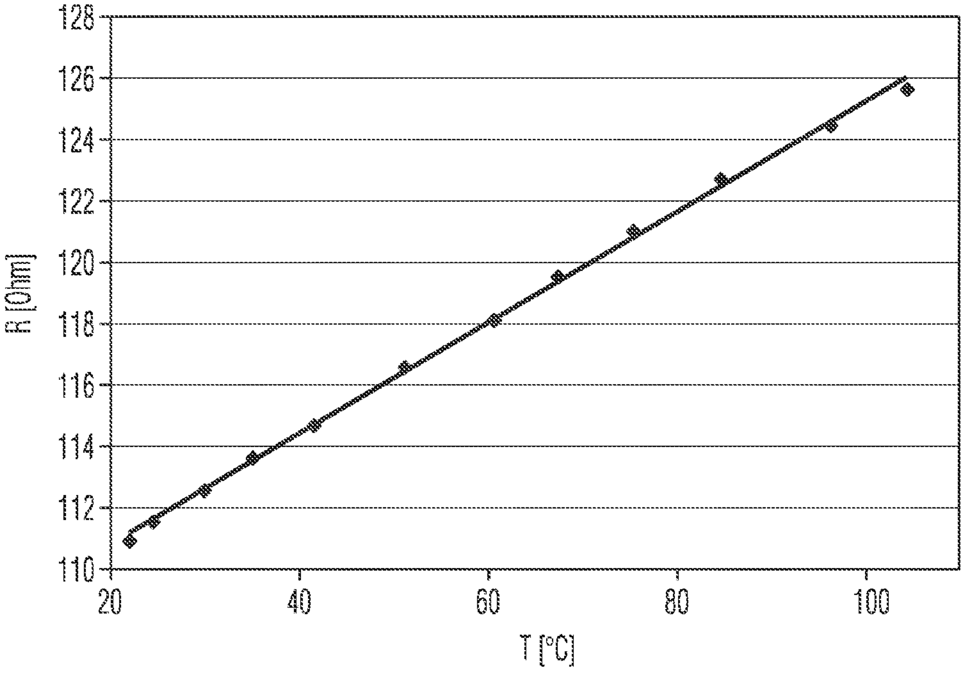
FIG. 8 a diagram to illustrate the temperature-dependent change of the electrical resistance of the heat coating of a panel heater.

FIG. 8, in which the change in resistance of the coating 3 associated with a temperature change for a panel heater 1 with a glass substrate 2 and a transparent coating 3 based on the conductive material silver (Ag) is illustrated by way of example, is now also considered. In the diagram presented, the electrical resistance R (ohm) of the coating 3 is plotted against its temperature T (° C.). Observably, there is an at least almost linear correlation between the electrical resistance R and the temperature T, such that a temperature increase of the coating 3 is always accompanied by an increase in the electrical resistance. A temperature increase by 50° C. increases the electrical resistance here, for example, by approx. 10 ohm, such that local or global temperature increases can be detected reliably and safely.

With resumed reference to FIG. 1, it is now assumed that local overheating ("hot spot") appears in the heating field 9 near the upper long edge 6. This can, for example, occur as a result of the fact that a towel or a piece of clothing is hung over the upper long edge 6, with the dissipation of the heat generated in the heating field 9 into the surroundings being hindered. The local temperature increase in the heating field 9 results in a temperature increase in a section of the measurement current path 13 adjacent the hot spot. The reason for this is the thermal coupling between the heating field 9 and the measurement path 13, which is largely due to the heat conduction of the substrate 2, as well as to radiant heat to a small extent. The measurement current path 13 is warmed by this such that its electrical resistance increases. This change in resistance can be detected by the measuring device 16, with even relatively small resistance changes capable of being measured reliably and safely with a good signal-to-noise ratio. Since the measurement current path 13 is electrically isolated from the heating field 9, a measurement of the electrical resistance of the measurement current path 13 can occur independently of the heating current. To be sure, a glass substrate 2, for example, is a rather poor heat conductor such that the thermal coupling between the heating field 9 and the measurement current path 13 is relatively slight, but, in practice, even in this case, a significant increase in the resistance of the measurement current path 13, at least due to hot spots adjacent thereto, can be observed. It would also be conceivable to provide an additional thermal coupling between the heating field 9 and the measurement current path 13 in the edge strip 8. For example, the heating field 9 and the edge strip 8 could be connected by a layer made of electrically insulating material with good heat conductivity, which is applied on the substrate 2 and is not removed at the time of the formation of the first separating line 7.

In general, a zone 19 of the heating field 9, depending on the specific design of the panel heater 1, hereinafter referred to as "detection zone", can be associated with the measurement current path 13, which zone is thermally coupled with the measurement current path 13 such that a temperature change causes a (significant) resistance change in the measurement current path 13. The respective size of the detection zone 19 depends on the thermal coupling between the heating field 9 and the measurement current path 13, with a better thermal coupling causing a larger detection zone 19 and vice versa. Typically, but not absolutely essentially, the detection zone 19 extends over a portion of the heating field 9 adjacent the measurement current path 13, with the possibility that the detection zone 19 can even extend, with correspondingly good thermal coupling, over the complete heating field 9.

For example, the heating panel 1 depicted in FIG. 1 is configured through the special course of the measurement current path 13 and a detection zone 19 that covers only a portion of the heating field 9 to detect a local temperature increase in the heating field 9 primarily in the near vicinity of the upper long edge 6 and of the right short edge 5 of the heating field 9. In practical application, these can be, for example, those regions of the heating field 9 in which, in all likelihood, hot spots occur due to improper handling.

In the arrangement 39, the measuring device 16 can be coupled to a control and monitoring device 40 of the panel heater 1 such that the feed voltage applied to the connecting electrodes 10, 11 is turned off or at least reduced enough that further overheating is avoided. The control and monitoring device 40 can be set up programmatically for this such that the feed voltage is turned off or at least reduced by a predefined or predefinable amount as soon as the increase in resistance in the measurement current path 13 exceeds an electively predefined or predefinable threshold value. Also, a gradual reduction of the feed voltage can be provided based on detected resistance values. Alternatively or additionally, the control and monitoring device 40 can be coupled with an optical and/or acoustic output device 41 such that local overheating of the heating field 9 is optically and/or acoustically indicated. The user can then take appropriate measures such as manually turning off or reducing the feed voltage of the panel heater 1.

Figure 2:
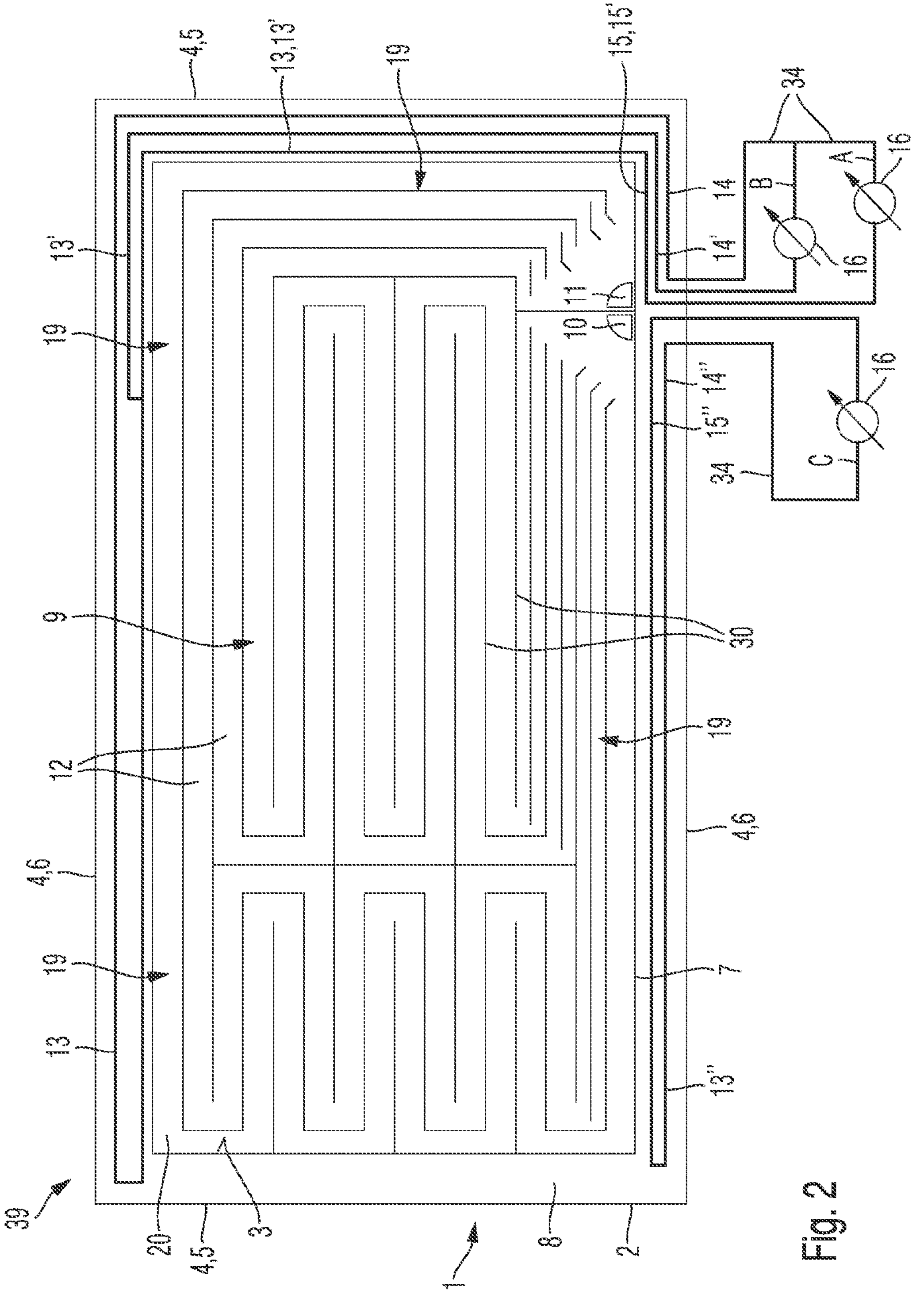
FIG. 2-4 in each case, schematic top views of different variants of the panel heater of FIG. 1 with a plurality of current paths running in the edge strip.

Reference is now made to FIG. 2, in which another exemplary embodiment of the panel heater 1 according to the invention is illustrated. In order to avoid unnecessary repetition, only the differences relative to the exemplary embodiment of FIG. 1 are explained and reference is otherwise made to the statements made there.

According to it, the panel heater 1 comprises three measurement current paths 13, 13', 13", incorporated into the conductive coating 3 in the form of conductor tracks within the edge strip 8, which are, in each case, electrically isolated from the heating field 9. The three conductor loops differ from each other only through their respective course. Thus, a first measurement current path 13 extends, starting from a first connecting section 14 at the level of the two connecting electrodes 10, 11 roughly up to the level of the left heating field corner 20 and in the opposite direction back again to a second connecting section 15 at the level of the two connecting electrodes 10, 11. A second measurement current path 13' extends, starting from a first connecting section 14' at the level of the two connecting electrodes 10, 11, only a small stretch along the upper long edge 6 and back again in the opposite direction. Here, the second measurement current path 13' uses a part of the conductor track of the first measurement current path 13, such that the first and second measurement current path 13, 13' share, in particular, a common second connecting section 15. A third measurement current path 13" extends, starting from a first connecting section 14" at the level of the two connecting electrodes 10, 11, along the lower long edge 6 and back again in the opposite direction to a second connecting section 15".

The measurement current paths 13, 13', 13" are in each case short-circuited by the connection lines 34 of a separate measuring device 16 to form a measuring circuit, referenced here in this order as measuring circuits A, B, and C. Whereas the two measuring circuits A, B serve for detecting a temperature-dependent resistance change for the detection of hot spots in the heating field 9, the measuring circuit C is used only as a reference circuit. If the detection zones 19 of the measurement current paths 13, 13',13" cover, in each case, only a portion of the heating field 9, a spatially resolved detection of hot spots can occur by means of the two measuring circuits A and B, with the spatial proximity of a hot spot to the measuring circuit A or B detectable. On the other hand, a detection zone 19, in which at least in certain applications in practice (e.g., space heating) no hot spots are supposed to occur, is associated with the measuring circuit. Thus, a reference signal dependent on the momentary temperature of the heating field 9 can be generated by the measuring circuit C, which signal enables a reliable and safe ascertaining of hot spots based on a resistance change in the measuring circuits A and B. The panel heater 1 of FIG. 2 thus permits a particularly reliable, spatially resolved detection of hot spots. It is understood that the measuring devices 16 depicted in FIG. 2 can also be realized by a single measuring device 16.

Figure 3:
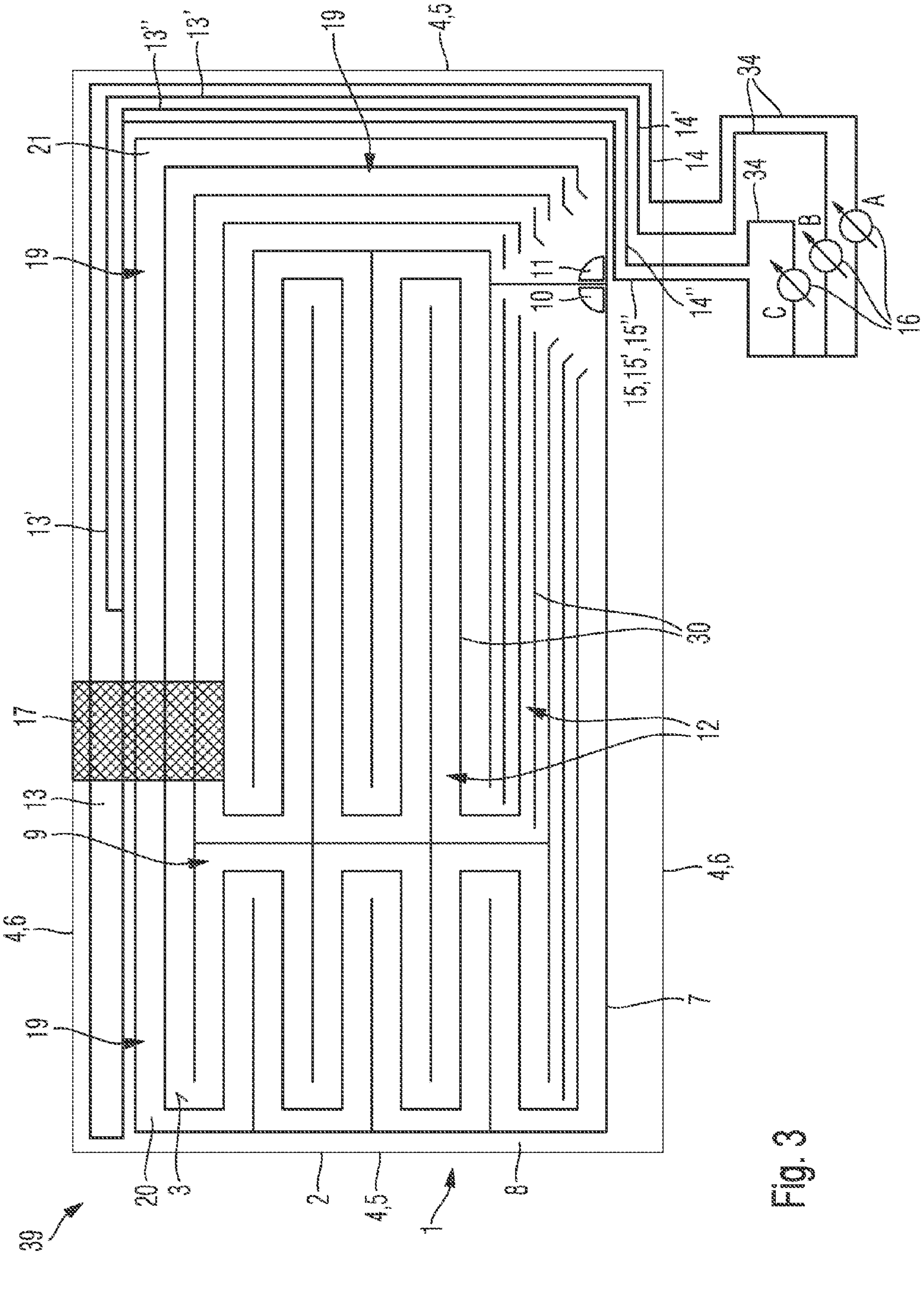

Reference is now made to FIG. 3, in which another exemplary embodiment of the panel heater 1 according to the invention is illustrated. In order to avoid unnecessary repetition, only differences relative to the exemplary embodiment depicted in FIG. 2 are explained and reference is otherwise made to the statements made there.

According to it, the panel heater 1 comprises three measurement current paths 13, 13', 13" formed into the conductive coating 3 as conductor tracks with in the edge strip 8, which are, in each case, electrically isolated from the heating field 9. The three measurement current paths 13, 13', 13" have a course different from that in FIG. 2 and are used without a reference circuit exclusively for detecting hot spots 17, of which one is shown by way of example. The first measurement current path 13, which belongs to measuring circuit A, extends analogously to FIG. 2, starting from a first connecting section 14 at the level of the two connecting electrodes 10, 11, roughly up to the level of the left heating field corner 20 and in the opposite direction back again to a second connecting section 15 at the level of the two connecting electrodes 10, 11. The second measurement current path 13', which belongs to measuring circuit B, extends, starting from a first connecting section 14' at the level of the two connecting electrodes 10, 11, roughly to the center of the upper long edge 6 and back again in the opposite direction. Here, the second measurement current path 13' uses a part of the conductor track of the first measurement current path 13, such that the first and second measurement current paths 13, 13' share, in particular, a common second connecting section 15. The third measurement current path 13" extends, starting from a first connecting section 14" at the level of the two connecting electrodes 10, 11, along the right short edge 5 and back again in the opposite direction. Here, the third measurement current path 13" uses a part of the common conductor track of the first and second measurement current paths 13, 13', such that the first, second, and third measurement current path 13, 13', 13" share, in particular, a common second connecting section 15. If the detection zones 19 associated with the three measurement current paths 13, 13', 13" cover, in each case, only a portion of the heating field 9, the measuring circuits A, B, C enable a spatially resolved detection of hot spots 17, with the spatial proximity of a hotspot 17 to the measuring circuit A, B, or C detectable. The hot spot 17 depicted by way of example in FIG. 3 in the region of the upper long edge 6 has the greatest spatial proximity to the first measurement current path 13 or measuring circuit A and, consequently, causes a strongest temperature rise there and, with it, a maximum change in the electrical resistance. Since the hotspot 17 causes no correspondingly great resistance change in the measuring circuits B and C, the spatial location of the hot spot 17 can be unequivocally associated with the detection zone 19 of the measuring circuit A.

Figure 4:
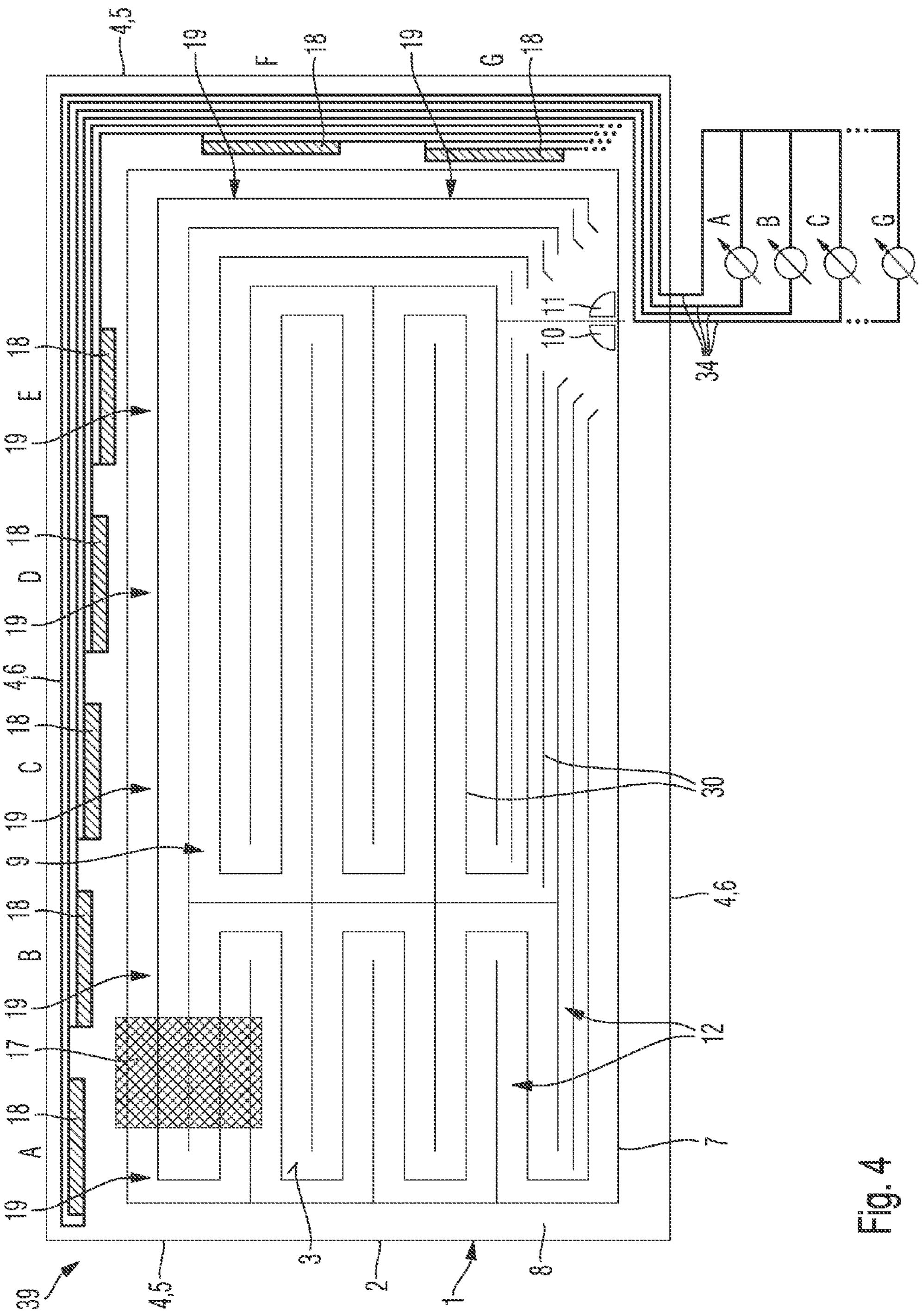

Reference is now made to FIG. 4, in which another exemplary embodiment of the panel heater 1 according to the invention is illustrated. In order to avoid unnecessary repetition, only the differences relative to the exemplary embodiment depicted in FIG. 3 are explained and references otherwise made to the statements made there.

According to it, the panel heater 1 comprises a plurality of measurement current paths not referenced in detail within the edge strip 8, which are, in each case, electrically isolated from the heating field 9 and which yield the measuring circuits A, B, C etc. In contrast to FIG. 3, each measurement current path includes a spatially limited zone 18, hereinafter referred to as “measuring zone”, in which the conductor track changes its course direction multiple times (i.e., has a plurality of conductor track sections curved in opposite directions), with the conductor track sections situated very close to each other within the measuring zone 18 with little distance therebetween. The measurement current paths have, for example, a meanderingly curved course in the schematically depicted measuring zones 18. As depicted in FIG. 4, measurement current paths adjacent each other have common path stretches, with each measurement current path connected to an adjacent measurement current path (measuring circuit). The measuring zones 18 of the different measuring circuits A, B, C, etc. are spatially separated from each other and disposed distributed with roughly equal distances therebetween along the upper long edge 6 and right short edge 5. Since the measurement voltage drops predominantly in the region of the measuring zones 18, the detection zones 19 of the measuring circuits A, B, C, etc. can, in each case, be associated with the measuring zones 18 such that a spatially resolved detection of hot spots is possible, with the spatial proximity of a hot spot to the measuring zone 18 of a measuring circuit A, B, C, etc. detectable. In FIG. 4, one hot spot 17, which is located in the vicinity of the two measuring zones 18 of the measuring circuits A and B, is depicted by way of example. Thus, the hot spot 17 will cause a strongest temperature rise or increase in resistance in the measuring zone 18 of the measuring circuit A and of secondary importance in the measuring zone 18 of the measuring circuit B. The panel heater 1 of FIG. 4 thus enables a highly sensitive and particularly precise spatially resolved detection of hot spots 17 by means of the distributedly disposed measuring zones 18 of the different measuring circuits.

Figure 5:
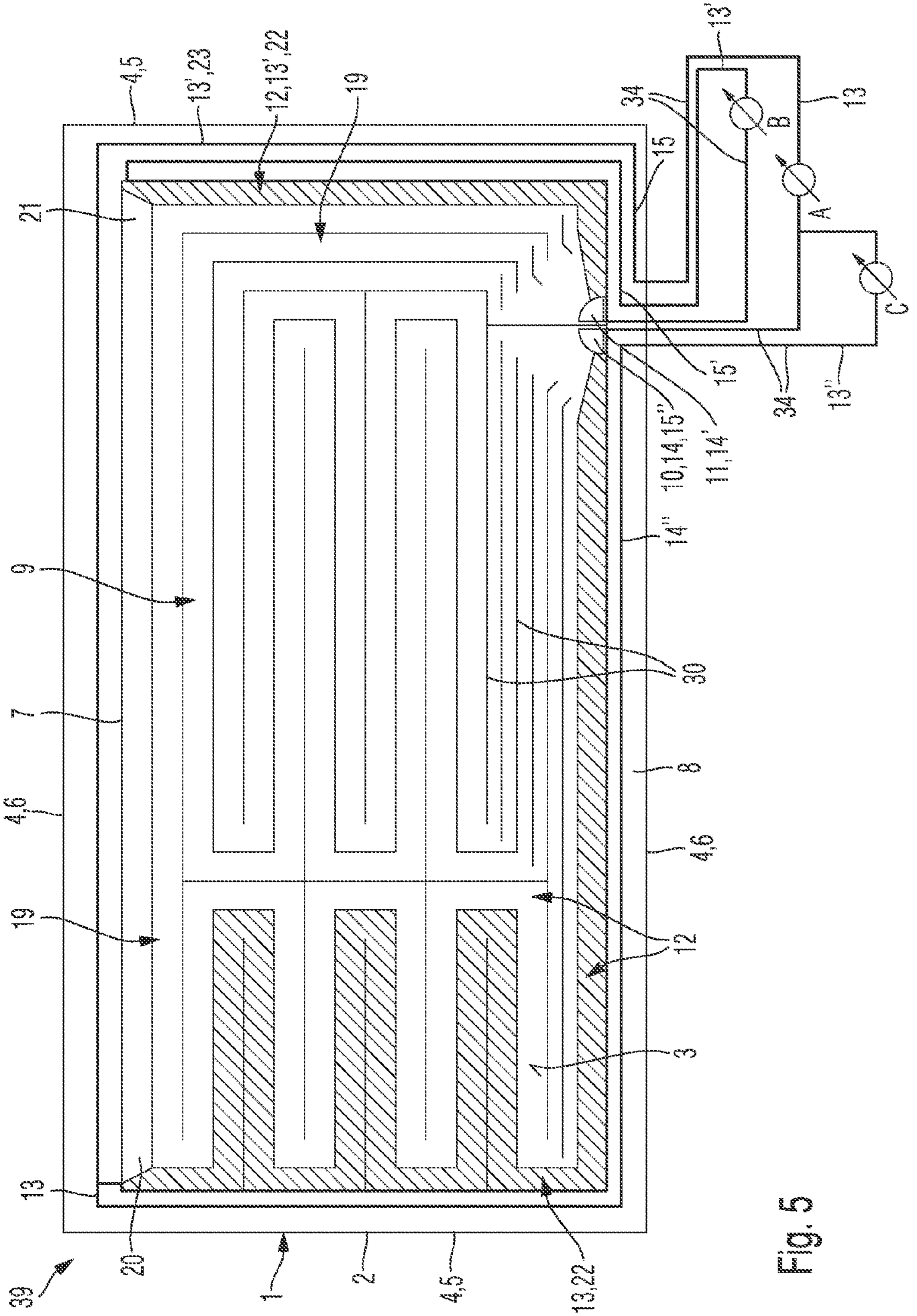
FIG. 5 a schematic top view of another exemplary embodiment of the panel heater according to the invention, in which the measurement current paths run partially in the heating field and partially in the edge strip.

Reference is now made to FIG. 5, in which another exemplary embodiment of the panel heater 1 according to the invention is illustrated. In order to avoid unnecessary repetition, only the differences relative to the exemplary embodiments illustrated in FIG. 1 through 4 are explained and reference is otherwise made to the statements made there.

The panel heater 1 of FIG. 5 differs from the previous exemplary embodiments by the partial course of measurement current paths 13 within the heating field 9, as well as by their contacting. Here, analogously to FIG. 2, two measuring circuits A and B, as well as one reference circuit C are provided. Thus, a first measurement current path 13 uses a path section of a heating current path 12, in this case, for example, a heating current path 12 adjacent the first separating line 7. The first measurement current path 13 extends within the heating field 9 of the first connecting electrode 10 (in FIG. 5, left connecting electrode), which serves here as a first connecting section 14, along the lower short edge 5 and the left long edge 6 adjacent thereto. Then, the heating current path 12 changes the direction of its course in its course along the left long edge 6 multiple times in opposite directions. In the region of the upper left heating field corner 20, the first measurement current path 13 leaves the heating field 9, passes over into the edge strip 8, and runs from then on completely within the edge strip 8. The first separating line 7, by which the edge strip 8 is electrically partitioned off from the heating field 9, is for this reason not implemented there. In the edge strip 8, the first measurement current path 13 extends as a conductor track incorporated into the coating 3 along the upper long edge 6 and the short edge 5 adjacent thereto, as well as a short stretch along the lower long edge 6, where it ends at the level of the second connecting electrode 11 (in FIG. 5, right connecting electrode) in a second connecting section 15. The two connection lines 34 with the measuring device 16 connected therebetween contact the first connecting electrode 10 and the second connecting section 15 of the first measurement current path 13 to form the measuring circuit A. The first measurement current path 13 thus comprises a heating field section 22 situated in the heating field 9 and an edge strip section 23 situated in the edge strip 8.

A second measurement current path 13' runs similarly partially in the heating field 9 and, for this, uses a different section of the same heating current path 12 as the first measurement current path 13. The second measurement current path 13' extends from the second connecting electrode 11 (in FIG. 5, right connecting electrode) in the heating current path 12 a short stretch along the lower long edge 6 and the right short edge 5 adjacent thereto. In the region of the upper right heating field corner 21, the second measurement current path 13' leaves the heating field 9, passes over into the edge strip 8, and runs from then on completely within the edge strip 8. The second separating line 7, by which the edge strip 8 is electrically partitioned off from the heating field 9, is not implemented for this there. In the edge strip 8, the second measurement current path 13' extends as a conductor track formed in the coating 3 along the right short edge 5, as well as a short stretch along the lower long edge 6, where it ends at the level of the second connecting electrode 11 in a second connecting section 15'. The two connection lines 34 with the measuring device 16 connected therebetween contact the second connecting electrode 11 and the second connecting section 15' of the second measurement current path 13' to form the measuring circuit B. The second measurement current path 13' thus likewise comprises a heating field section 22 situated in the heating field 9 and an edge strip section 23 situated in the edge strip 8.

Since the width or cross-sectional area of the heating field section 22 of the two measurement current paths 13, 13' is, in each case, greater than that in the edge strip section 23, the electrical resistance within the heating field 9 is substantially less than in the edge strip 8. In the exemplary embodiment depicted, the width or cross-sectional area of the first or second measurement current path 13, 13' within the heating field 9 is, in each case, for example, 2 to 100 times, in particular 85 times, the width or cross-sectional area in the edge strip 8. It is understood that the width within the heating field 9 depends on the layout of the heating current paths 12 and can vary widely. Thus, the measurement voltage for measuring a resistance change drops substantially over the edge strip sections 23. The detection zones 19 of the two measurement current paths 13, 13' can thus be allocated to the edge strip sections 23. For the case in which the detection zones 19 cover, in each case, only a portion of the heating field 9, a spatially resolved detection of hotspots in the heating field 9 is possible by means of the edge strip sections 23 of the two measurement current paths 13, 13'. A particular advantage of this embodiment consists in that the conductor tracks of the measuring circuits A and B require, in each case, only relatively little space in the edge strip 8, such that the measuring circuits A, B can be implemented even with narrow edge strips 8. A measurement of the electrical resistance in the measuring circuits A, B can take place simultaneously with the feeding of heating current by means of a difference in potential between the measurement voltage and the feed voltage.

Analogously to FIG. 2, a third measurement current path 13" serves to form a measuring circuit C. Thus, the third measurement current path 13" extends, starting from a first connecting section 14" at the level of the two connecting electrodes 10, 11 in the form of a conductor track incorporated into the coating 3 along the lower long edge 6 and the upper long edge 6 adjacent thereto and runs back again in the opposite direction, for which purpose the conductor track incorporated into the coating 3 in the region of the left heating field corner 20 passes over into the edge strip section 23 of the first measurement current path 13. One connection line 34 of the measuring device 16 contacts the first connecting section 14" of the third measurement current path 13"; the other connection line 34, the connection line 34 of the measuring circuit A connected to the first connecting electrode 10. The measuring circuit C is used only as a reference circuit and enables ascertaining hotspots based on a reference signal dependent on the momentary temperature of the heating field 9 such that a particularly reliable and safe detection of hotspots is possible.

Figure 6:
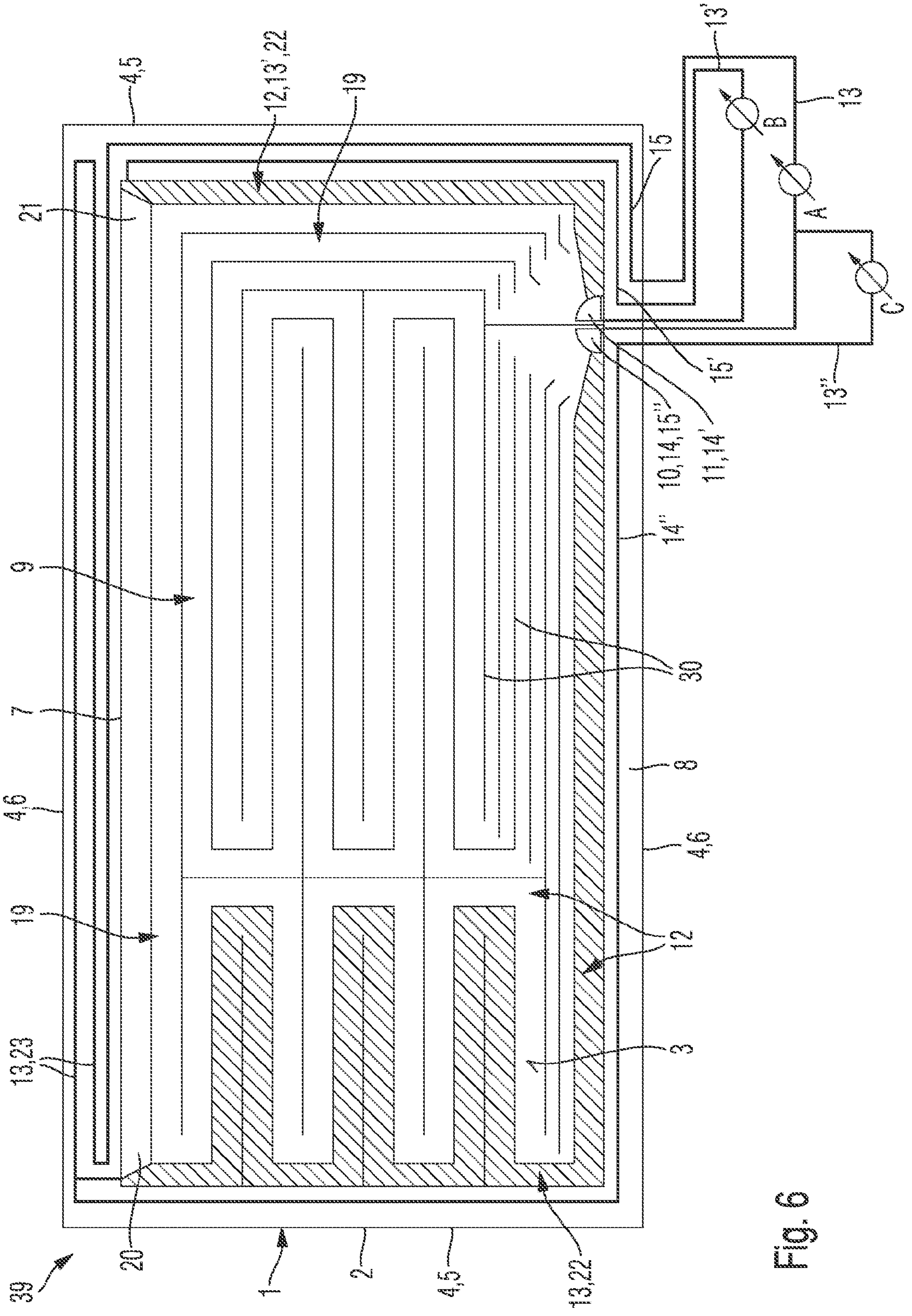
FIG. 6 a schematic top view of a variant of the panel heater of FIG. 5.

Reference is now made to FIG. 6, in which another exemplary embodiment of the panel heater 1 according to the invention is illustrated. In order to avoid unnecessary repetition, only the differences relative to the exemplary embodiment illustrated using FIG. 5 are explained and reference is otherwise made to the statements made there.

The panel heater 1 of FIG. 6 differs from the panel heater of FIG. 5 only in that the edge strip section 23 of the first measurement current path 13 in the region of the upper long edge 6 changes the direction of its course multiple times in opposite directions (measurement current path sections curved in opposite directions) and has here, for example, a meanderingly curved course. This measure makes it possible for the measurement voltage to drop substantially in the edge strip section 23 adjacent the upper long edge 6 such that the sensitivity and spatial resolution for detection of hot spots are increased in this region.

Figure 7A:
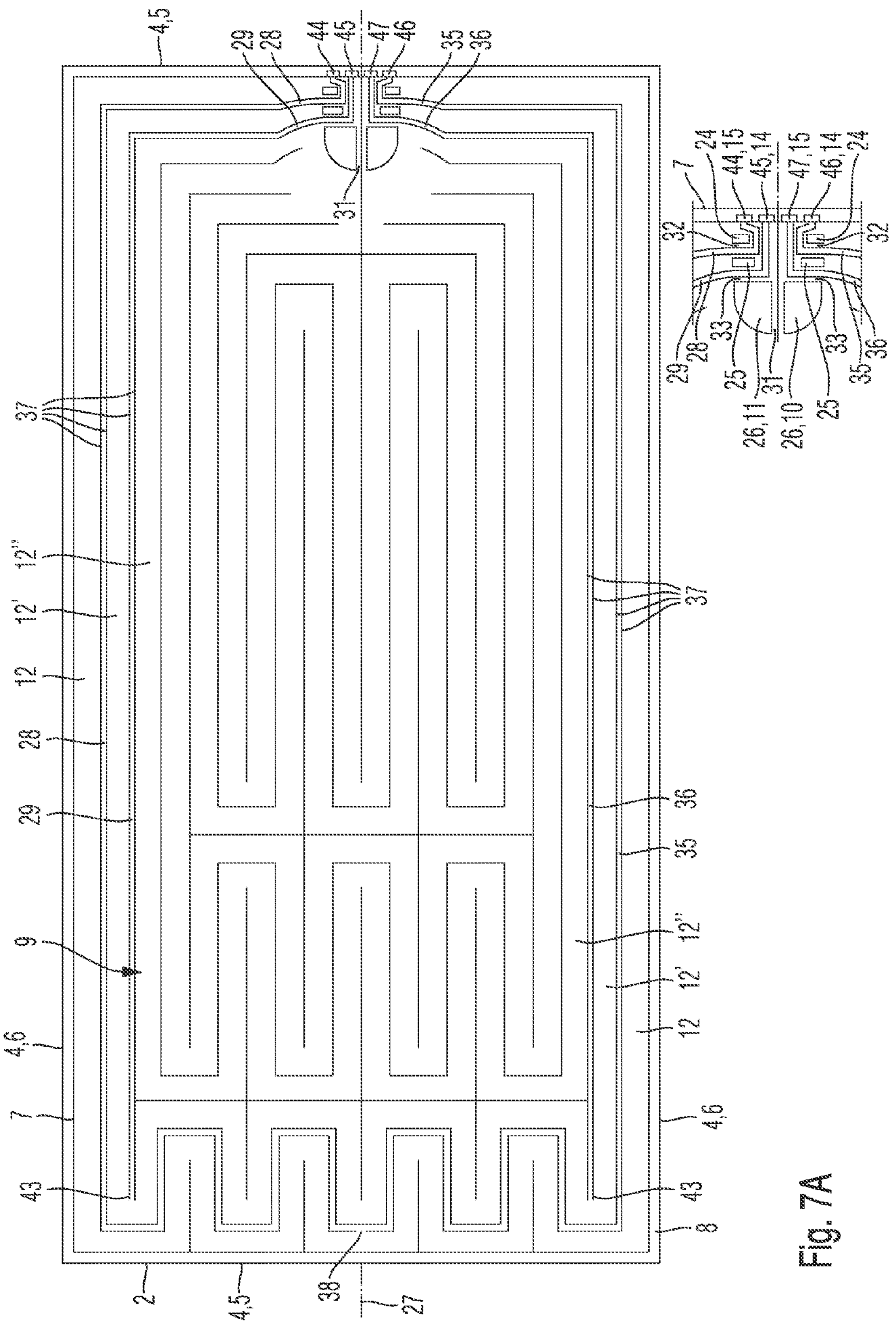
FIG. 7A-7C a schematic top view (FIG. 7A) of another exemplary embodiment of the panel heater according to the invention, with measurement current paths (FIG. 7B) in the heating field, which are connected as a Wheatstone bridge (FIG. 7C)
Figure 7B:
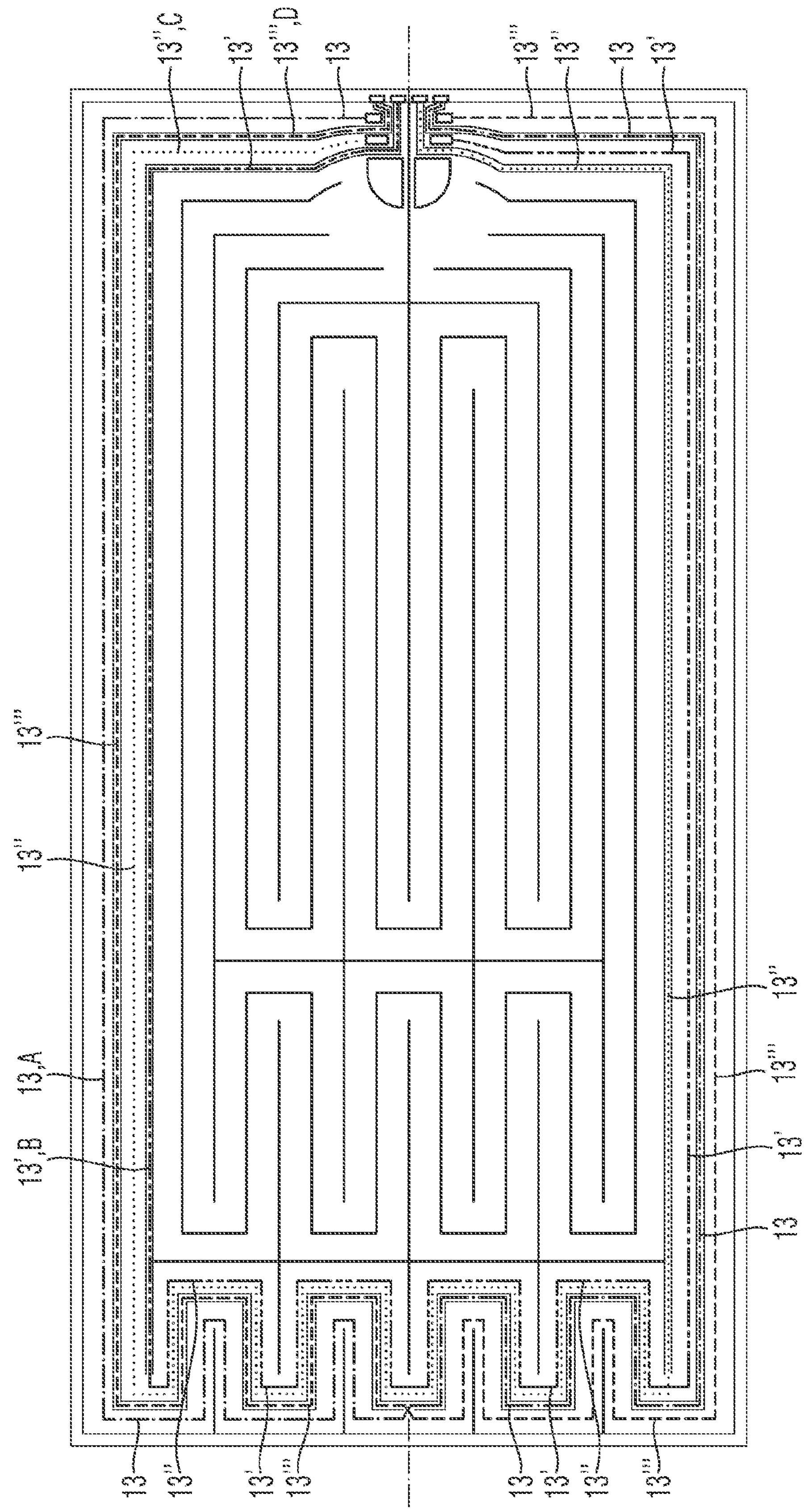
Figure 7C:
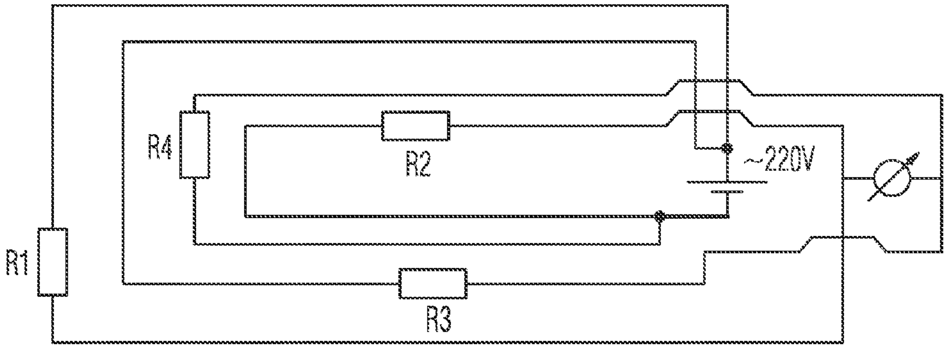

Now, with reference to FIG. 7A-7C, another exemplary embodiment of the panel heater 1 according to the invention is explained. The panel heater 1 differs from the panel heaters 1 illustrated in FIG. 1 through 6 through the virtually complete course of measurement current paths within the heating field 9, as well as through the contacting of the measurement current paths. Here, four measuring circuits A, B, C, and D are formed, as is explained in detail in the following.

FIG. 7A is considered first, in which the layout of the panel heater 1 is depicted. According to it, the panel heater 1 has here, for example, a mirror-image symmetric structure relative to an axis of symmetry 27, which passes through the center of the two short edges 5. In addition, the two connecting electrodes 10, 11 are, in each case, divided into three, first through third, electrode sections 24-26 electrically isolated from each other, with the three electrode sections of one and the same connecting electrode 10, 11 electrically connected to each other in a plane different from the coating 3 (not shown in detail). The two connecting electrodes 10, 11 are also depicted in FIG. 7A in an enlarged view.

Four measurement current paths 13, 13', 13'', 13''' are implemented, which are, in each case, composed of a path section of a heating current path 12, 12' and a substantially narrower conductor track incorporated into the conductive coating 3 of the heating field 9, hereinafter referred to as "measurement current track". As depicted in FIG. 7A, the panel heater 1 includes, for this purpose, on each side of the axis of symmetry 27, two measurement current tracks, in each case, i.e., a first measurement current track 28 and a second measurement current track 29, as well as a third measurement current track 35 and a fourth measurement current track 36, which are, in each case, formed by third separating lines 37, for example, by lasering, into the conductive coating 3. The measurement current tracks 28, 29, 35, 36 have, compared to the heating current paths 12, a (e.g., substantially) smaller width or cross-sectional area, which is associated with a correspondingly greater electrical resistance such that in the measurement current paths 13, 13', 13'', 13''', the measurement voltage drops substantially over the measurement current tracks 28, 29, 35, 36. Here, the first measurement current track 28 and the third measurement current track 35 extend, in each case, in the heating field 9 between a first heating current path, which is adjacent the first separating line 7, and a second heating current path 12' lying inside and adjacent thereto, all the way to a (common) first measurement current track end 38 at roughly the central level of the left short substrate edge 5. The first measurement current track 28 runs in the region of the second connecting electrode 11 in a second electrode intermediate space 32 between the first electrode section 24 and the second electrode section 25 of the second connecting electrode 11 and then passes over into a first electrode intermediate space 31 between the two connecting electrodes 10, 11, until it ends in a separate first connection spot 44. On the first measurement current track end 38, the first measurement current track 28 is electrically connected to the part of the first heating current path 12 situated below the axis of symmetry 27. The third measurement current track 35 extends in the region of the first connecting electrode 10 in a second electrode intermediate space 32 between the first electrode section 24 and the second electrode section 25 of the first connecting electrode 10 and then passes over into the first electrode intermediate space 31 between the two connecting electrodes 10, 11, where it ends in a third connection spot 46. On the first measurement current track end 38, the third measurement current track 35 is electrically connected to the part of the first heating current path 12 situated above the axis of symmetry 27. Otherwise, the first measurement current track 28 and the third measurement current track 35 are electrically partitioned off from the first and second heating current path 12, 12'.

The second measurement current track 29 and the fourth measurement current track 36, which lie, respectively, farther inside, extend in the heating field 9 between the second heating current path 12' and an adjacent third heating current path 12'' all the way to a respective second measurement current track end 43. The second measurement current track 29 extends in the region of the second connecting electrode 11 in a third electrode intermediate space 33 between the second electrode section 25 and the third electrode section 26 of the second connecting electrode 11 and then passes over into the first electrode intermediate space 31 between the two connecting electrodes 10, 11, where it ends in a second connection spot 45. On the associated second measurement current track end 43, the second measurement current track 29 is electrically connected to the second heating current path 12'. The fourth measurement current track 36 extends in the region of the first connecting electrode 10 in a third electrode intermediate space 33 between the second electrode section 25 and the third electrode section 26 of the first connecting electrode 10 and then passes over into the first electrode intermediate space 31 between the two connecting electrodes 10, 11, where it ends in a fourth connection spot 47. On the associated second measurement current track end 43, the fourth measurement current track 36 is electrically connected to the second heating current path 12'. Otherwise, the second measurement current track 29 and the fourth measurement current track 36 are electrically partitioned off from the first and second heating current path 12, 12'.

Now, FIG. 7B is considered, in which the different measuring circuits are depicted schematically. Here, the first measurement current path 13, corresponding to the measuring circuit A, is connected in series to a second measurement current path 13', corresponding to the measuring circuit B. The first measurement current path 13 extends, starting from the first electrode section 24 of the second connecting electrode 11 in the first heating current path 12, all the way to the first measurement current track end 38, where it passes over into the third measurement current track 35. The third measurement current track 35 is short-circuited with the second measurement current track 29, which is part of the second measurement current path 13'. For this, the third connection spot 46 and the second connection spot 45 are electrically connected to each other (which is not shown in detail). These two connection spot 45, 46 form together a first connecting section 14. The second measurement current path 13' passes over at the associated second measurement current track end 43 into the second heating current path 12', which is electrically connected to the second electrode section 25 of the first connecting electrode 10. On the other hand, the third measurement current path 13'', corresponding to the measuring circuit C, is connected in series to a fourth measurement current path 13''', corresponding to the measuring circuit D. The third measuring current path 13'' extends, starting from the second electrode section 25 of the second connecting electrode 11 in the second heating current path 12' all the way to the associated second measurement current track end 43, where it passes over into the fourth measurement current track 36. The fourth measurement current track 36 is short-circuited with the first measurement current track 28, which is part of the fourth measurement current path 13'''. For this, the fourth connection spot 47 and the first connection spot 44 are electrically connected. These two connection spots 44, 47 form together a second connecting section 15. The fourth measurement current path 13''' passes over in the first heating current path 12, which is electrically connected to the first electrode section 24 of the first connecting electrode 10. Thus, on the one hand, the measuring circuits A and B and, on the other, the measuring circuits C and D are connected in series.

FIG. 7C depicts the equivalent circuit diagram of the panel heater 1. Here, resistor R1 corresponds to the measuring circuit A, resistor R2 to the measuring circuit B, resistor R3 to the measuring circuit C, and resistor R4 to the measuring circuit D. The first electrode 10 is connected, for example, to the negative terminal of a voltage source; and the second electrode 11, to the positive terminal of the voltage source. A measuring device 16 to ascertain electrical voltage changes is electrically connected to a node between the two resistors R1 and R2 and another node between the two resistors R3 and R4, yielding a Wheatstone bridge circuit. These two nodes correspond to the two connecting sections 14, 15, which result from an electrical connection of the second and third connection spots 45, 46 or the first and fourth connection spots 44, 47.

The Wheatstone bridge circuit thus obtained enables a particularly simple and highly sensitive detection of a change in the resistors R1-R4. This can take place according to the following formula:

$$U/U_0=\frac{1}{4}(\Delta R2/R-\Delta R1/R-\Delta R4/R+\Delta R3/R)$$

where $U_0$ is the supply voltage of the measurement bridge applied to the two connecting electrodes 10, 11 and U is the bridge voltage. ΔR1 through ΔR4 are the respective resistance changes on the resistors R1 through R4.

LIST OF REFERENCE CHARACTERS

1 panel heater
2 substrate
3 coating
4 substrate edge
5 short edge
6 long edge
7 first separating line
8 edge strip
9 heating field
10 first connecting electrode
11 second connecting electrode
12, 12', 12" heating current path
13, 13', 13", 13'" measurement current path
14 first connecting section
15 second connecting section
16 measuring device
17 hot spot
18 measuring zone
19 detection zone
20 left heating field corner
21 right heating field corner
22 heating field section
23 edge strip section
24 first electrode section
25 second electrode section
26 third electrode section
27 axis of symmetry
28 first measurement current track
29 second measurement current track
30 second separating line
31 first electrode intermediate space
32 second electrode intermediate space
33 third electrode intermediate space
34 connection line
35 third measurement current track
36 fourth measurement current track
37 third separating line
38 first measurement current track end
39 arrangement
40 control and monitoring device
41 output device
42 substrate area
43 second measurement current track end
44 first connection spot
45 second connection spot
46 third connection spot
47 fourth connection spot

The invention claimed is:

1. A panel heater, comprising:

at least one flat substrate;

an electrically conductive coating; and a plurality of straight and meandering coating-free separating lines created by completely removing regions of the electrically conductive coating, wherein interconnections of the plurality of straight and meandering coating-free separating lines create one or more contiguous regions of the electrically conductive coating separated by the coating-free separating lines, the one or more contiguous regions configured to provide one or more heating current paths for conduction of a heating current and one or more measurement current paths for conduction of a measurement current, wherein the electrically conductive coating extends at least over a part of a substrate area and is electrically connected to at least two connecting electrodes provided for electrical connection to two terminals of a voltage source, such that by applying a feed voltage, a heating current flows in a heating field, wherein the one or more measurement current paths differ at least in sections from the one or more heating current paths, and wherein the one or more measurement current paths are thermally coupled at least to a portion of the heating field and have at least two connecting sections for connecting a measuring device for ascertaining an electrical resistance of the one or more measurement current paths when the measurement current is conducted.

2. The panel heater according to claim 1, wherein the one or more measurement current paths are formed into the electrically conductive coating at least in sections in an edge strip surrounding the heating field and electrically isolated from the heating field.

3. The panel heater according to claim 2, wherein the one or more measurement current paths are implemented at least in sections in portions of the edge strip different from each other.

4. The panel heater according to claim 2, wherein one or more measurement current paths are implemented such that they change their path direction repeatedly in a spatially limited measuring zone of the edge strip.

5. The panel heater according to claim 4, wherein the spatially limited measuring zones are disposed spatially distributed at least over a portion of the edge strip.

6. The panel heater according to claim 1, wherein the one or more measurement current paths are electrically isolated from the heating field.

7. The panel heater according to claim 1, wherein one or more measurement current paths have a measurement current path section, which is part of the one or more heating current paths or is formed by the one or more heating current paths.

8. The panel heater according to claim 1, wherein the at least two connecting electrodes are electrically connected to two measurement current path arrays connected in parallel, in which, in each case, two measurement current paths are connected to each other in series, wherein each of the two measurement current path arrays has a connecting section disposed between the serially connected two measurement current paths for connecting the measuring device.

9. The panel heater according to claim 1, wherein at least one of the one or more measurement current paths serves as a reference current path for ascertaining a reference resistance for other measurement current paths.

10. An arrangement comprising:

the panel heater according to claim 1, which has at least one measuring device connected to the at least two connecting sections of the one or more measurement current paths for ascertaining electrical resistances and a control and monitoring device with a data link to the measuring device, wherein the control and monitoring device is configured such that a feed voltage is reduced or turned off when the electrical resistance of the one or more measurement current paths exceeds a settable threshold value.

11. The arrangement according to claim 10, wherein the control and monitoring device has a data link to an optical or acoustic output device for outputting optical or acoustic signals, wherein the control and monitoring device is configured such that an optical or acoustic signal is outputted when the electrical resistance of the one or more measurement current paths exceeds the predefinable threshold value.

12. A method comprising:

using a panel heater according to claim 1 as a functional and/or decorative individual piece and as a built-in part in furniture, devices, and buildings, as well as in means of transportation for travel on land, in the air, or on water.

13. The method according to claim 12 wherein the panel heater is used as a heater in living spaces comprising a wall mountable or freestanding heater.

14. The method according to claim 12, wherein the panel heater is used in motor vehicles comprising a windshield, rear window, side window and/or glass roof.

15. A method for operating a panel heater, comprising:

providing a panel heater with at least one flat substrate and an electrically conductive coating, which extends at least over part of a substrate area and is electrically connected to at least two connecting electrodes provided for electrical connection to two terminals of a voltage source such that by applying a feed voltage, a heating current flows in a heating field; and determining an electrical resistance of one or more measurement current paths thermally coupled to the heating field by conducting a measurement current through the one or more measurement current paths, wherein the one or more measurement current paths have at least two connecting sections for connecting a measuring device for determining the electrical resistance of the one or more measurement current paths when the measurement current is conducted, wherein the panel heater comprises a plurality of straight and meandering coating-free separating lines created by completely removing regions of the electrically conductive coating, wherein interconnections of the plurality of straight and meandering coating-free separating lines create one or more contiguous regions of the electrically conductive coating separated by the coating-free separating lines, the one or more contiguous regions configured to provide one or more heating current paths for conduction of the heating current and the one or more measurement current paths for conduction of the measurement current.

16. The method according to claim 15, wherein the feed voltage is reduced or turned off when the electrical resistance of the one or more measurement current paths exceeds a settable threshold value.

17. The method according to claim 15, wherein an optical and/or acoustic signal is outputted if the electrical resistance of the one or more measurement current paths exceeds a settable threshold value.

* * * * *